June 11, 1963 R. J. WHITCROFT 3,093,205
PRECISION BALANCES
Filed May 23, 1961 5 Sheets-Sheet 4

INVENTOR
ROBERT JOHN WHITCROFT
BY
Nerderoth, Lind & Ponack
ATTORNEYS

INVENTOR
ROBERT JOHN WHITCROFT
BY
ATTORNEYS

United States Patent Office 3,093,205
Patented June 11, 1963

3,093,205
PRECISION BALANCES
Robert J. Whitcroft, West Norwood, London, England, assignor to Stanton Instruments Limited, London, England
Filed May 23, 1961, Ser. No. 111,959
Claims priority, application Great Britain May 23, 1960
10 Claims. (Cl. 177—184)

This invention relates to precision balances of the kind in which weighing is effected by means of a beam and change of weight is normally indicated by the movement of the beam within a range of deflection.

Such balances as now manufactured are of high sensitivity and the range of weighing can be considerably extended without loss of accuracy beyond that represented by one deflection of the beam by the provision of suitable weight-loading mechanism.

The movement of the beam is generally damped to such an extent that it is substantially dead-beat, that is to say when a change in weight occurs the beam moves to a new position without appreciable overshoot or oscillation. Although it is possible to use oil or magnetic means to provide such damping, for balances of the highest precision it is still preferred to use air damping which is completely reliable in normal use and is very effective. However, since the damping effect is a function of density, air damping gives rise to difficulties if the nature or pressure of the surrounding atmosphere is different from air at atmospheric pressure.

It is an object of the present invention to provide an improved arrangement which, while retaining the advantages of air damping, will enable measurement to be carried out in any gaseous atmosphere and at any pressure without change in the damping effect.

Figure 1:
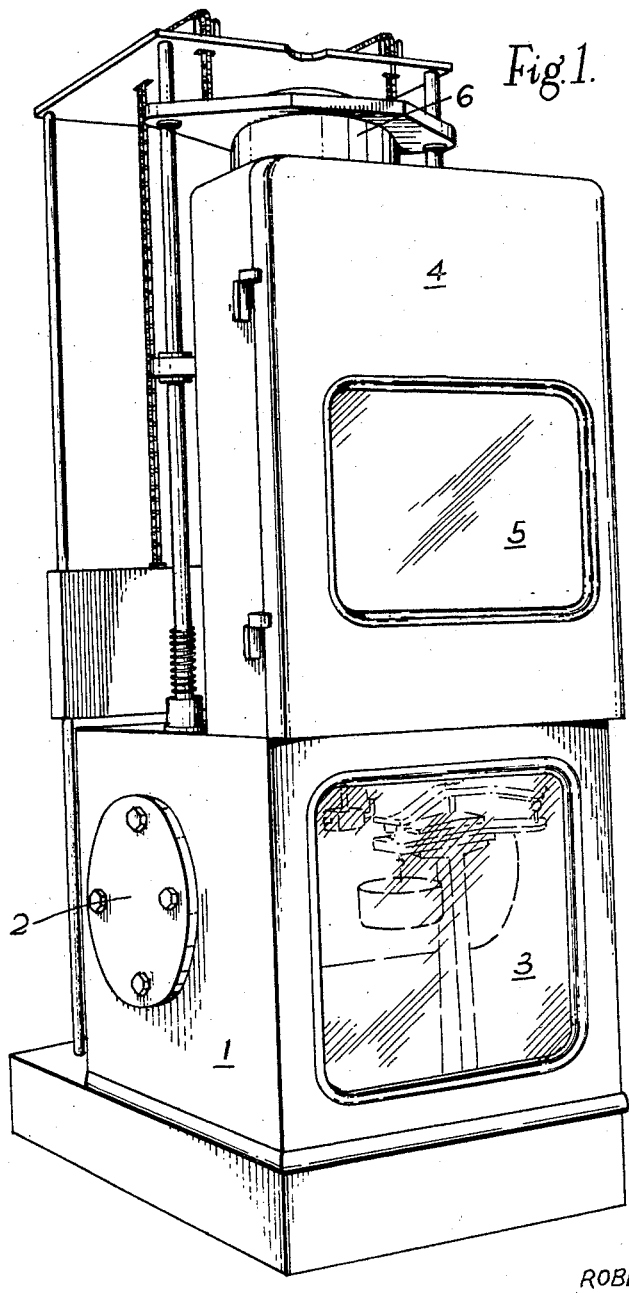
Figure 2:
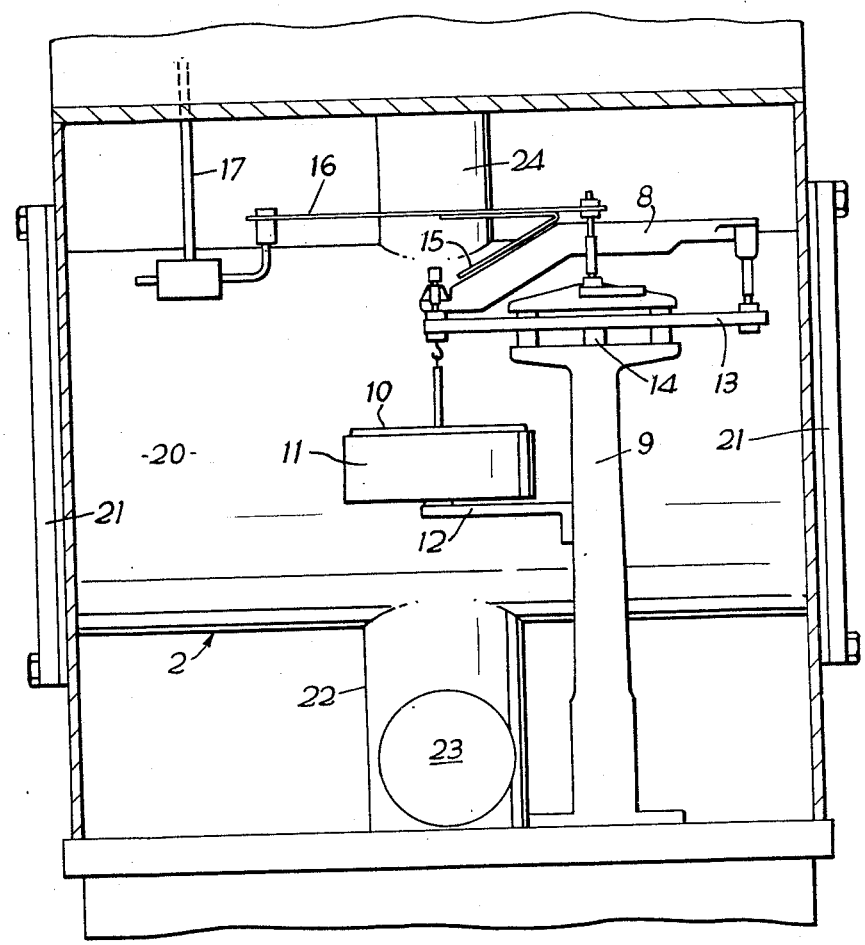
Figure 3:
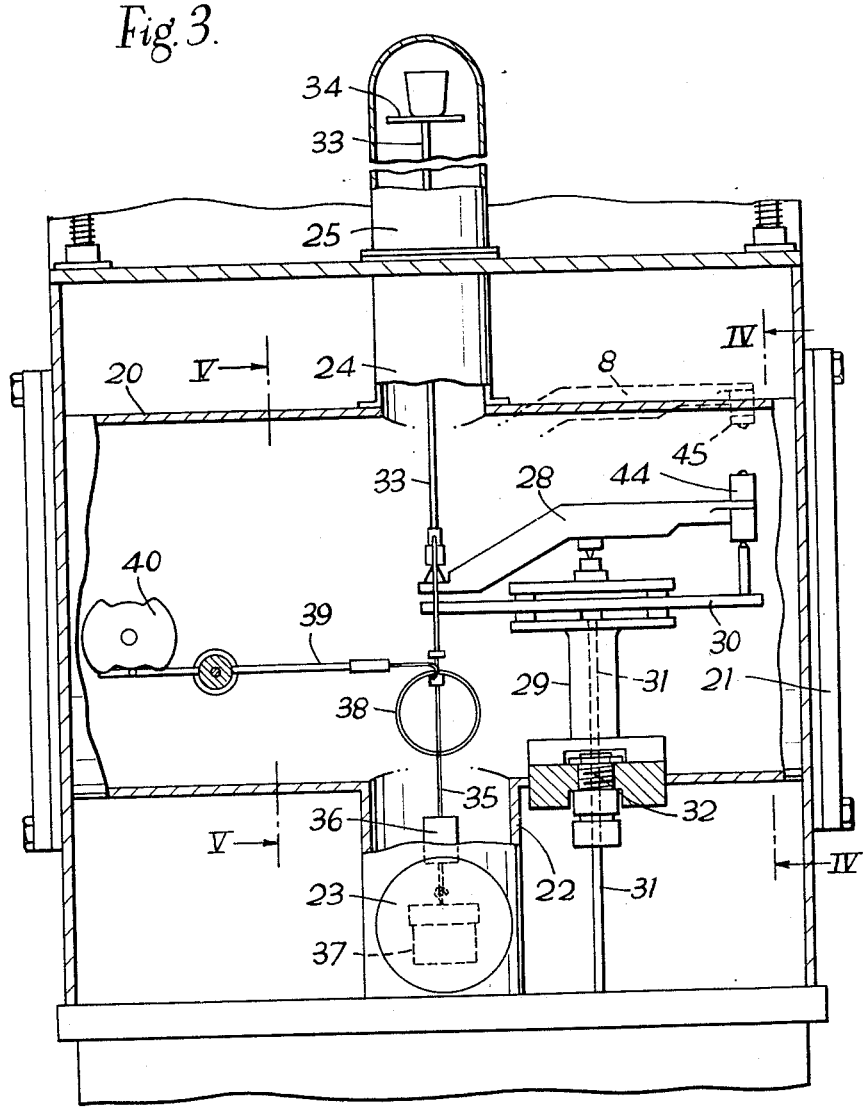
Figure 4:
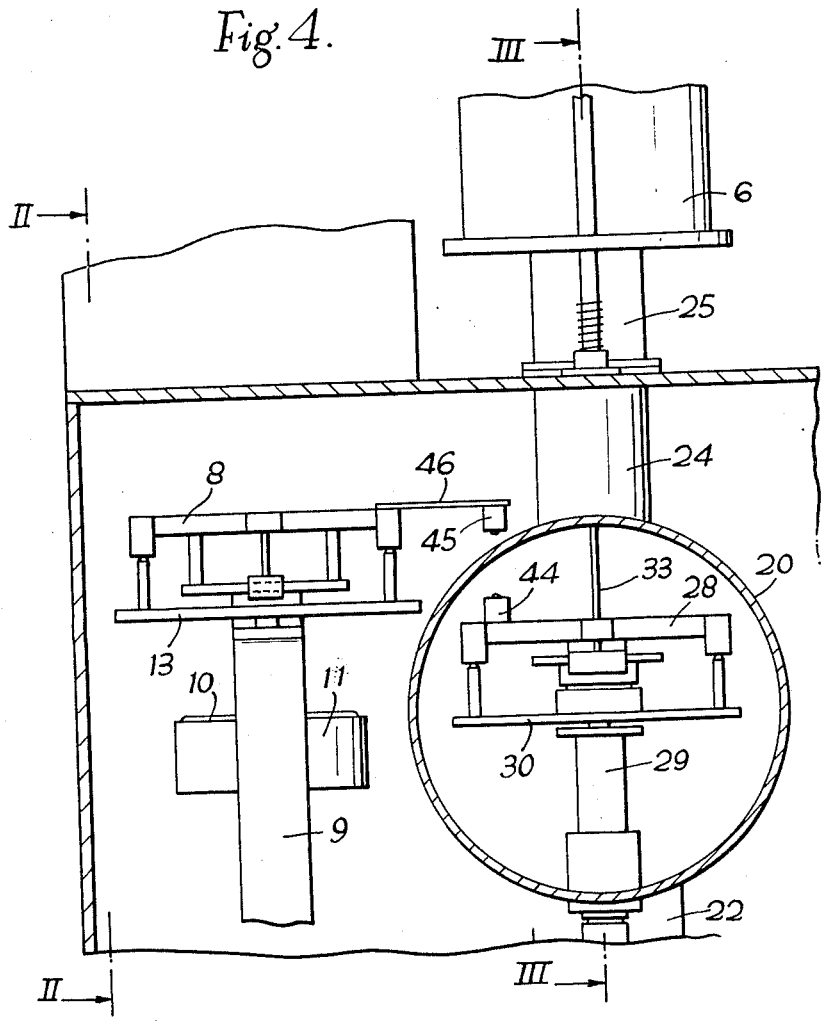
Figure 5:
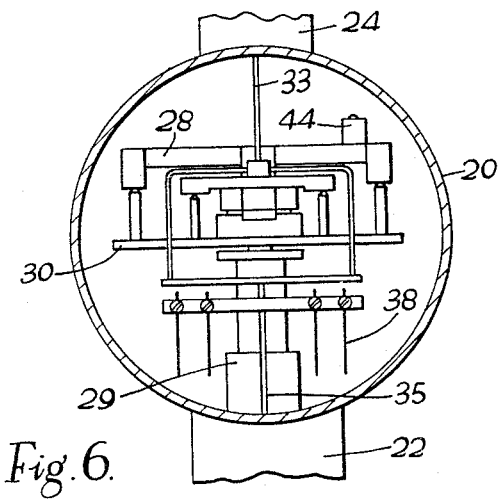
Figure 6:
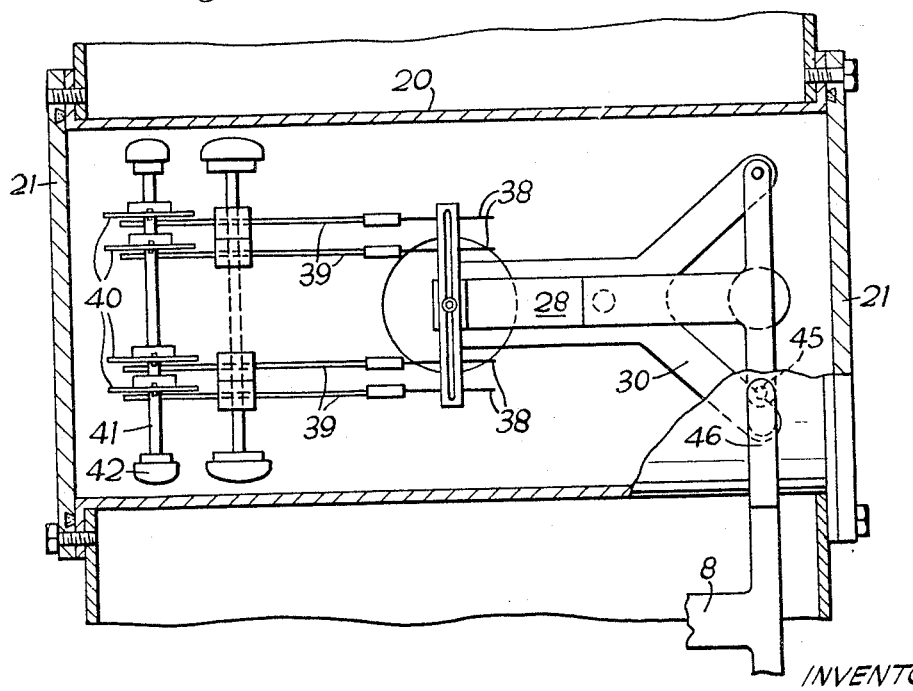

Other objects and advantages of the improved balance of this invention will become apparent from the following description of one form thereof with reference to the accompanying drawings, in which:

FIGURE 1 is a perspective view of the complete balance,

FIGURE 2 is a front view, partly in section, of part of the balance of FIGURE 1 and showing the damping beam as seen when looking in the direction of the arrows II—II in FIGURE 4, FIGURE 3 is a front view, partly in section, showing the weighing beam as seen when looking in the direction of the arrows III—III in FIGURE 4, FIGURE 4 is a side view, partly in section, of part of the balance shown in FIGURE 1 as seen from the right-hand side and looking in the direction of the arrows IV—IV in FIGURE 3, FIGURE 5 is a section taken on the line V—V in FIGURE 3, and FIGURE 6 is a plan view, partly in section, of part of the balance shown in FIGURE 1.

The improved precision balance of this invention comprises two separate and similar beams of which one is a weighing beam arranged as a free-swinging beam and the other is a damped beam using air as the damping medium, and the two beams are coupled together so that they move in unison. Preferably the coupling between the two beams is effected by magnetic means which enables the weighing beam to be completely separated from the damping beam. For example, the weighing beam could be completely separated from the damping beam by means of partitions, screens and the like as might be required when weighing radio-active materials. Likewise the weighing beam could be enclosed in a chamber which could be filled with any desired gas at any pressure or could be evacuated. In all such cases the magnetic coupling means will operate to transmit to the weighing beam the damping provided by the damping beam and since such damping will be entirely uneffected by the environment of the weighing beam the preferred damping medium, air, may be used for damping the damping beam. It will of course be appreciated that the material of which the screens, partitions or chamber is made must be such as not to affect the operation of the magnetic coupling means.

Referring firstly to FIGURE 1, the balance there shown is of the kind in which a specimen may be weighed while being heated by means of a furnace and comprises a main casing 1 which houses a chamber 2 containing the weighing beam, and the damping beam which is visible through the glass panel 3, and supports an upper casing 4 containing apparatus for recording weight, temperature and other variables of interest on charts visible through a glass panel 5. Mounted above the main casing 1 and behind the upper casing 4 is a furnace 6 which is movable from the position shown downwards so as to surround a specimen which is supported by and above the weighing beam in known manner.

The damping beam which is best seen in FIGURE 2 comprises a beam 8 which is supported in conventional manner by a knife edge on a plane carried on top of a pillar 9. The moving element 10 of an air dashpot type damping member is hung from a stirrup on the left-hand end of the beam and the fixed element 11 of the dashpot is mounted on a bracket 12 fast with the pillar 9. A normal arrestment mechanism is provided which includes the frame 13 mounted on the upper end of a rod 14 which extends downwards through the pillar 9, the lower end of the rod engaging the face of a cam, not shown, which is rotatable so as to lift the frame 13 to arrest the beam 8 or so as to allow the frame to fall to action the beam.

Mounted adjacent the upper surface of part of the beam 8 is a plate-like member 15 which constitutes one electrode of a capacity type follower mechanism, the beam itself being the other electrode. The member 15 is mounted on an arm 16 which is pivotally supported at its right-hand end on an extension of the pillar 9, and at its left-hand end by a rod 17 which is part of the follower mechanism (not shown) and which in operation moves in a vertical direction so as to maintain constant the spacing of the member 15 from the beam 8. The follower mechanism, which is of known kind, will not be described in detail herein since it forms no part of the present invention. A description of one suitable form of such mechanism may be found in United States Patent No. 2,812,172 assigned to the assignees of the present applicant, and it is sufficient to say that if the beam 8 is deflected and the capacity between member 15 and the beam changes, the mechanism operates to move rod 17 so as to re-position the member 15 and restore the capacity to its original value. The member 15 and rod 17 thus move in sympathy with the movement of the beam 8 and movement of rod 17 or parts movable therewith may be applied to control the recording apparatus and weight loading mechanism.

From the foregoing it will be seen that apart from co-operating with the follower mechanism, and this mechanism albeit at some inconvenience could equally well work with the weighing beam, the function of the damping beam 8 is to provide damping. It is accordingly practicable to provide a very high degree of damping if required and to this end a second damping device could be provided on the other side of the beam or two-stage damping devices could be provided on one or each side of the beam as required.

In FIGURE 2 and behind the beam 8 and pillar 9 may be seen the chamber 2 which as shown is constructed so that it may be evacuated or filled with a gas at reduced or positive pressure. The chamber comprises a hollow cylinder 20 which extends across the casing 1 with its axis horizontal and which is closed at its ends by removable plates 21. The cylinder 20 has a downwardly directed extension 22 which leads to vacuum or pressure equipment, not shown, and is provided with an access door 23, and an upwardly directed extension 24 which is joined at its upper end to the lower end of a tall thimble shaped member 25, FIGS. 3 and 4, by means of a demountable vacuum and pressure tight seal. This member is formed of a suitable heat resistant material since it extends within the furnace 6 when the latter is in its lower position.

Referring now to FIGURES 3, 4, 5 and 6, it will be seen that there is arranged within the chamber 2 a second beam 28, the weighing beam, which is supported by a knife edge on a plane carried by pillar 29 and provided with arrestment frame 30 carried on rod 31. The arrangement of the knife edge and plane and the operation of the arrestment frame are conventional and in all respects the same as the corresponding parts of the damping beam 8, and it is sufficient to point out that the rod 31 extends downwardly through pillar 29 and through the wall of cylinder 20 by means of a suitable seal 32 to a cam, not shown, which is mounted on the same shaft as is the cam which operates the arrestment mechanism of the damping beam 8. The two beams may therefore be arrested or actioned simultaneously by rotation of such shaft. The beam 28 carries on its left-hand end (FIG. 3) by means of a suitable stirrup a rod 33 which extends upwardly through the extension 24 into member 25 where it is provided with a platform 34 on which may be placed a specimen to be weighed, and a second rod 35 which extends downwardly into extension 22 where it is provided with a counterweight 36 which maintains the assembly of rods 33 and 35 and platform 34 vertical. A canister 37 is hung on the lower end of rod 35 and can be removed therefrom through door 23 (FIG. 2). The canister contains a series of weights and as the beam 28 is operated under constant loading conditions after a specimen has been placed on platform 34 in position for weighing, an equal weight is removed from the canister 37 which is then re-hung on rod 34.

Beam 28 also carries on the left-hand end (FIG. 3) a series of weights 38 which in normal manner are added or removed by arms 39 operated by cams 40. These cams are carried on a shaft 41 which extends through a seal 42 (FIG. 6) in the wall of cylinder 20 to a driving motor, not shown. Since the weight loading mechanism and its mode of operation is conventional and well known to those skilled in the art, it will not be further described herein but attention is directed to the aforesaid United States Patent No. 2,812,172 for a description of one form of such mechanism.

As thus far described it will be seen that the improved balance comprises two entirely separate beams, one, the weighing beam 28, arranged within a chamber which may contain a gas under positive or negative pressure or may be evacuated, and provided with conventional weight-loading mechanism so that weighing of a specimen can be carried out over a range of deflections but being entirely undamped so that it would not be capable of performing such weighing operation satisfactorily, and the other, the damping beam 8, which is arranged outside the chamber, which is not provided with weight loading mechanism but which is air damped so that its motion is substantially aperiodic.

In accordance with the invention, the two beams are coupled together by magnetic means so that the movement of the weighing beam is exactly reproduced by the damping beam which in turn operates to transmit damping to the weighing beam. As shown, the weighing beam 28 carries a small permanent magnet 44 which is positioned vertically below a similar magnet 45 carried on an extension 46 of the damping beam 8 as best seen in FIGURE 4. The two magnets are arranged with like poles facing and the force of magnetic repulsion which they exert on the two beams is counterbalanced, that is to say in the absence of magnetic forces the two beams are arranged to be out of poise in opposite directions. In one practical example where the adjacent ends of the magnets were spaced by 1½ inches, the force of magnetic repulsion was of the order of 600 mg. and the two beams were adjusted so as each to be out of poise by half that amount.

Very surprisingly it has been found that with the arrangement described the movement of the weighing beam will be reproduced by the damping beam to a high order of accuracy, that is to at least 1/10 mg. Moreover and notwithstanding the use of magnetic coupling it is still possible to attain the full sensitivity available in a normal balance of similar dimensions.

In carrying out the invention both beams will have the same order of sensitivity but final adjustments will be carried out on the damping beam 8 which of course is readily accessible. Provided that the two beams are, say, within 10% of each other, adjustments to cover all reasonable requirements can be carried out on the damping beam without involving a non-linearity of more than 1%.

It is an important feature of this invention that when the balance is required to operate over a range of weight greater than that corresponding to one deflection of the beam, weight loading is provided for the weighing beam as described above. It is not possible to achieve a satisfactory result by using weight loading on the damping beam since this would introduce serious non-linearity. However, for effecting minor change in poise it has been found that a small degree of weight loading may be applied to the damping beam and if this is not in excess of, say 20% of the beam deflection, the non-linearity introduced will be acceptable. Large scale or extensive weight loading must, however, be effected on the weighing beam.

In the use of the improved balance of this invention, it has been found that for weighing over any substantial period of time it is essential to arrest the two beams periodically as described in United States Patent No. 2,812,173, assigned to the assignees of the present applicant, since any slight movement of the knives on their planes will cause a relative movement of the magnets which introduces side thrusts that rapidly become greater as the beams move out of position.

It will be appreciated that various arrangements of the beams and coupling magnets are possible within the scope of this invention. The balance described herein and as illustrated in the drawings uses beams of a kind which have been developed for use in balance on the constant load type. It will be appreciated that the invention is equally applicable to a balance using beams of more conventional shape although the layout of the two beams may be influenced by their shape. For example, and more especially in the case of conventional beams, instead of arranging that the beams swing in parallel planes, they could be arranged to swing in planes that are at an angle to one another, for example the two beams could be at right angles to one another. Although such arangement could lead to a more compact construction, the paths on which the magnets would move relative to one another are such that non-linearity would be increased although this could to some extent be reduced by mounting the magnets on stirrups or the like so that their axes are always vertical. A similar expedient could be applied to the construction specifically described herein but has not been found to be necessary.

Likewise the two beams could be mounted parallel and one above the other and in this case two pairs of magnets could be used, one at each end of the beam.

I claim:

1. A precision balance comprising a normally completely enclosed chamber, an undamped first beam arranged within said chamber and indicating by its deflection a change in weight, a second beam external of said chamber, means for damping the movement of said second beam, and magnetic means having spaced opposed magnets coupling said two beams such that the damping of said second beam is transmitted to control the movement of said first beam.

2. A precision balance comprising a normally completely enclosed chamber, an undamped first beam arranged within said chamber and indicating by its deflection a change in weight, a second beam external of said chamber, air dashpot means for damping the movement of said second beam, and magnetic means having spaced opposed magnets coupling said beams so that they move in unison.

3. A precision balance comprising an undamped first beam arranged by its deflection to indicate a change in weight, weight loading mechanism associated with said first beam for controlling the weight loading thereof, a second beam, means for damping the movement of said second beam, and magnetic means having spaced opposed magnets coupling said two beams so that the damping of said second beam is transmitted to control the movement of said first beam.

4. A precision balance comprising a normally completely enclosed chamber, a first beam arranged in said chamber and indicating by its deflection a change in weight, weight loading mechanism in said chamber for controlling the weight loading on said first beam, a second beam external of said chamber, air dashpot means for controlling the damping of said second beam, and magnetic means having spaced opposed magnets coupling said beams so that they move in unison.

5. A precision balance comprising a first beam arranged by its deflection to indicate a change in weight, a second beam, means coupled to said second beam for damping the movement of said second beam, magnetic means having spaced opposed magnets coupling said beams so that they move in unison, and means coupled to said second beam for following and indicating the deflection of said first beam.

6. A precision balance comprising a first beam mounted on a knife edge for deflection in a first vertical plane, a second beam mounted on a knife edge for deflection in a second vertical plane, means coupled to one of said beams for damping the movement of said one of said beams, and magnetic means for coupling said beams, said means including a first magnet mounted on said first beam, a second magnet mounted on said second beam, said two magnets being arranged vertically one above the other and with like poles facing.

7. A precision balance comprising a chamber, a first beam mounted on a knife edge within said chamber and arranged by its deflection to indicate a change in weight, a second beam mounted on a knife edge external of said chamber, a first permanent magnet within said chamber and mounted on said first beam at a point spaced from the knife edge, a second permanent magnet external of said chamber and mounted on said second beam at a point spaced from the knife edge, said two magnets being spaced vertically one above the other and with like poles facing, and means for damping the movement of said second beam.

8. A precision balance comprising a chamber, a first beam mounted on a knife edge within said chamber and arranged by its deflection to indicate a change in weight, a second beam mounted on a knife edge external of said chamber, a first permanent magnet within said chamber and mounted on said first beam at a point spaced from the knife edge, a second permanent magnet external of said chamber and mounted on said second beam at a point spaced from the knife edge, said two magnets being spaced vertically one above the other and with like poles facing, an air dashpot device for damping the movement of said second beam, and means for following and recording the movement of said first beam.

9. A precision balance comprising two similar beams each mounted on a knife edge for deflection in a vertical plane, means connected to one of said beams for supporting a specimen to be weighed on said one of said beams, means including an air dashpot coupled to the other of said beams for damping the movement of the other of said beams, and magnetic means having spaced opposed magnets coupling said beams such that they move in unison.

10. A precision balance comprising two similar beams each mounted on a knife edge for deflection in a vertical plane, a permanent magnet mounted on each beam spaced from the knife edge thereof and such that said magnets are spaced apart vertically and with like poles facing, means coupled to one of said beams for damping the movement of said one of said beams, and means coupled to the other of said beams for following and recording the movement of the other of said beams.

References Cited in the file of this patent

UNITED STATES PATENTS

| | | |
|---|---|---|
| 636,389 | Pool | Nov. 7, 1899 |
| 2,386,643 | Wallace | Oct. 9, 1945 |
| 2,598,835 | Ryan | June 3, 1952 |
| 2,659,151 | Lee | Nov. 17, 1953 |
| 2,793,026 | Giardino | May 21, 1957 |
| 2,940,747 | Eder | June 14, 1960 |

FOREIGN PATENTS

| | | |
|---|---|---|
| 1,085,343 | Germany | July 14, 1960 |